United States Patent [19]

Eaton et al.

[11] Patent Number: 4,623,797
[45] Date of Patent: Nov. 18, 1986

[54] EVENT SCANNING

[75] Inventors: Homer L. Eaton, Leucadia; Joe Schmidt, Oceanside, both of Calif.

[73] Assignee: MTS Vektronics Corporation, Carlsbad, Calif.

[21] Appl. No.: 507,925

[22] Filed: Jun. 27, 1983

[51] Int. Cl.[4] ............................................. G01N 21/86
[52] U.S. Cl. .................................... 250/560; 356/376
[58] Field of Search ............... 250/563, 572, 202, 560, 250/235; 318/577; 356/376, 377, 384, 385, 386, 387

[56] References Cited

U.S. PATENT DOCUMENTS

| 3,441,334 | 4/1969 | Marks et al. | 350/7 |
|---|---|---|---|
| 4,122,525 | 10/1978 | Eaton | 364/560 |
| 4,146,926 | 3/1979 | Clerget et al. | 364/556 |
| 4,168,126 | 9/1979 | Altman et al. | 356/386 |
| 4,208,589 | 6/1980 | Dashwood et al. | 250/560 |
| 4,217,053 | 8/1980 | Lavanchy et al. | 356/387 |
| 4,290,698 | 9/1981 | Milana | 356/371 |
| 4,297,034 | 10/1981 | Ito et al. | 356/394 |
| 4,298,285 | 11/1981 | Ito | 356/376 |
| 4,320,462 | 3/1982 | Lund et al. | 364/525 |
| 4,342,091 | 7/1982 | Whitehouse et al. | 364/506 |
| 4,344,709 | 8/1982 | Provder et al. | 356/445 |
| 4,413,910 | 11/1983 | Cornu et al. | 250/202 |
| 4,532,429 | 7/1985 | Horikawa | 250/235 |

Primary Examiner—David C. Nelms
Assistant Examiner—James G. Gatto
Attorney, Agent, or Firm—Gausewitz, Carr & Rothenberg

[57] ABSTRACT

A scanning laser beam is directed in a circular scanning pattern, perpendicular to the surface of a part that moves across the scan pattern. Reflected light received solely from part edges or other surface discontinuities is compared with a number of preselected threshold levels. When reflection intensity attains any one of the selected threshold levels, an event is triggered, and the beam position at the time of the event, together with the intensity level triggering the event, are recorded, so as to provide information limited to the part edges and other surface discontinuities.

39 Claims, 7 Drawing Figures

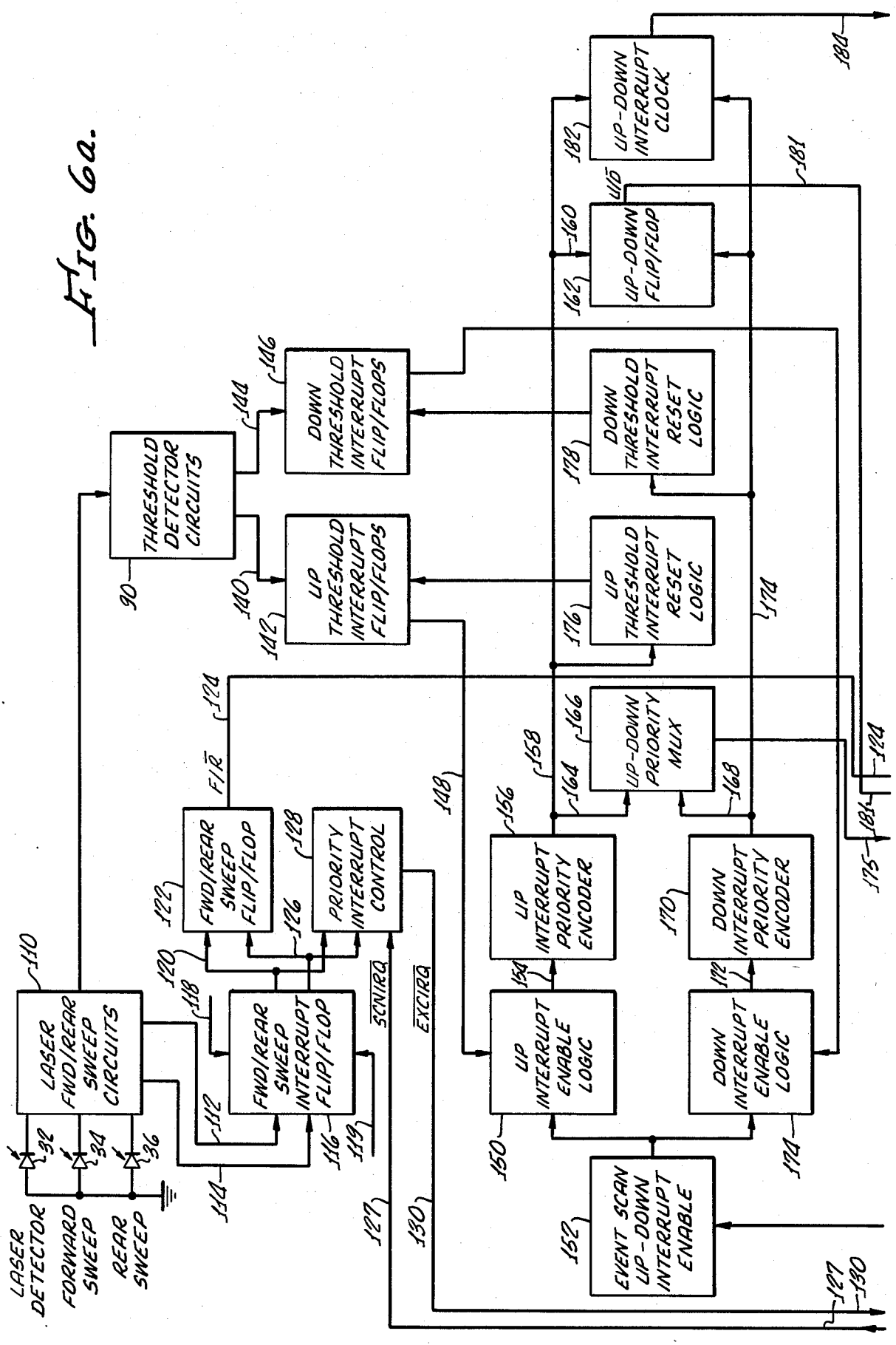

EVENT SCANNING

BACKGROUND OF THE INVENTION

The present invention relates to scanning of parts for inspection, identification, and analysis, and more particularly concerns scanning that produces data related to part edges, tranistions, and discontinuities.

Both reflecting and occluding types of optical scanning devices have been used for some time for inspection and identification of parts and to provide information concerning surface characteristics, configuration, orientation, discontinuities, and dimensions. In reflecting systems, a light beam is scanned across the surface of a part, and reflected light is received and periodically sampled as the light beam sweeps across the part surface. Sampled reflection intensities and beam positions at chronologically-fixed sampling times are processed in a computer to provide, in effect, a picture or display of the part surface. A system of this type is shown in a copending U.S. application for Method and Apparatus for Scanning, Ser. No. 383,950, filed June 1, 1982, by Homer L. Eaton and John D. Shaylor-Billings, and assigned to the assignee of the present invention. Such a system provides information concerning the nature of the part surface, its configuration, and location of its edges. However, the reflective system must scan and handle data from the entire surface of the part. If the precise location of the part is not known, the system must also scan and handle data from at least closely adjacent areas of the part background or suport. Huge quantities of data are gathered in such scanning so that system resolution is limited by its capacity for handling received data. In scanning an illustrative ten inch by ten inche field with a resoltuion of 256 data points in each direction, data points can be obtained at about 0.050 inch intervals. At such a resolution, the data for a ten inch by ten inch field can be handled in a memory of reasonable size (in the order of about 64,000 bytes). However, if the size of the scan field is increased while maintaining the same resolution, or if a greater resolution is desired (or if it is desired to increase both field size and resolution), the required memory size for handling all of the data may become excessive. For example, in scanning a ten inch by ten inch field with a resolution of 0.004 inches in only one direction (and 0.05 inches in the other), a memory of many megabytes would be required. Therefore, the information available with prior systems of practical data handling capacity has limited resolution or field size. The high resolution required for obtaining information concerning such features (i.e., edges or other discontinuities) may not be available without enormous data handling capacity and, even so, may require excessive time.

Another type of optical scanning system provides information concerning part profile by optical occlusion techniques. Systems of this type are shown in the U.S. patents to Eaton, U.S. Pat. No. 4,122,525; Dashwood et al, U.S. Pat. No, 4,208,589; Ito, U.S. Pat. No. 4,298,285; and Altman et al, U.S. Pat. No. 4,168,126. In such occluding systems, a light beam is caused to travese the object which occludes the light, preventing it from reaching the light detector, except when the light is not directed at the object. Thus, the projected light of a scanning beam passes the object until the beam reaches the object edge as the the scan approaches the object, and the beam is occluded as it traverses the object until it reaches the next edge of the object and passes off the object. Such occluding systems can identify the edge of the object, but can provide no detailed information concerning its nature or configuration. For example, such a system would provide no information that is capable of identifying details of a chamfered or rounded edge. Unless a part has a sharp, precise, and square edge, prior systems are unable to precisely define a part configuration and will not provide detailed information concerning the configuration of the edge itself without handling inordinately large amounts of data. The handling of such large amounts of data not only requires high capacity, expensive computer memory, but may take an undesirably long time for the processing.

Accordingly, it is an object of the present invention to provide part scanning that avoids or minimizes above-mentioned problems.

SUMMARY OF THE INVENTION

In carrying out principles of the present invention in accordance with a preferred embodiment thereof, an energy beam is swept across an object in a plurality of scan paths to illuminate areas of the object lying in the paths and to cause the beam energy to be reflected from the object with intensity that varies along the paths. A number of reference levels of reflection intensity are selected and compared with intensities of reflected beam energy. Each reference level that bears a predetermined relation to intensity of reflected beam energy is indicated, together with the location of the object area at which the reflected beam energy has such relation to the reference level. In effect, selected reflection intensity levels are used to trigger an event that is used to obtain a "bit slice" of data acquired at the event and only at the event. High resolution and high data compression are provided, because the system selects for presentation to the data handling circuits only the event data, namely information pertinent to the object edge or discontinuity. Data related to parts of the object between edges or discontinuities is ignored.

BRIEF DESCRIPTION OF THE DRAWINGS

FIGS. 6a and 6b comprise a more detailed block diagram of the data collection and organizing system of FIG. 5.

DETAILED DESCRIPTION OF THE INVENTION

Figure 1:
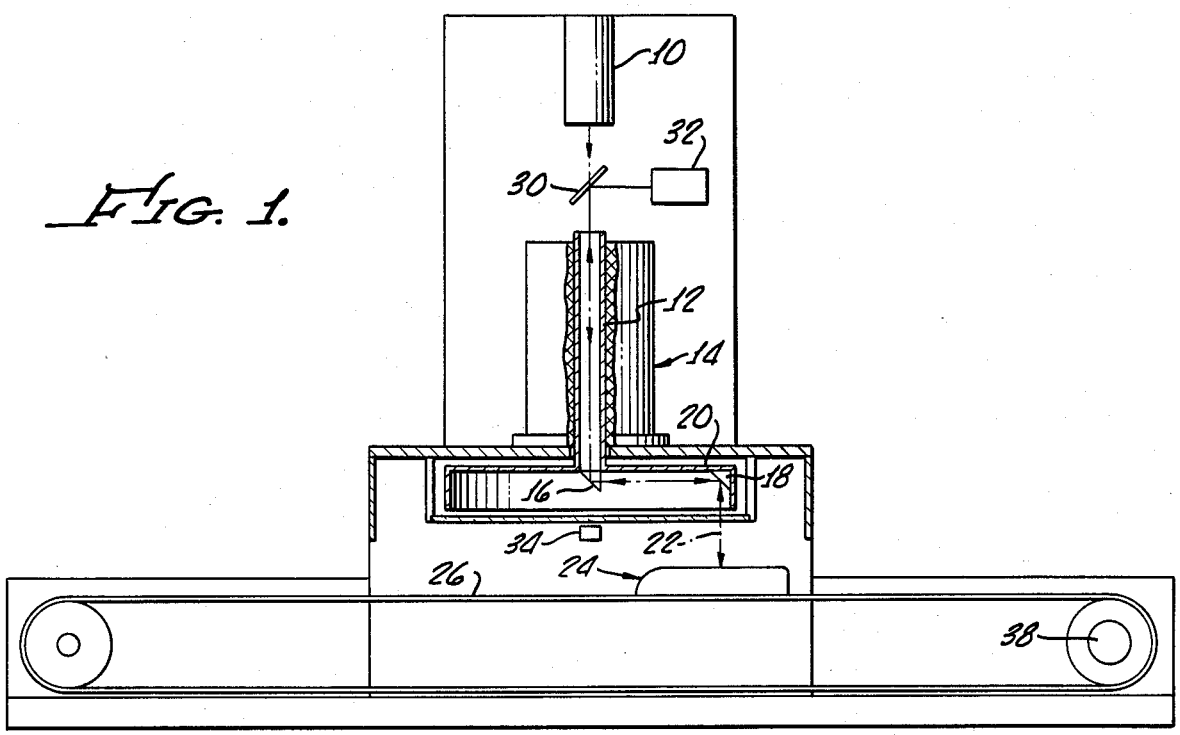
FIG. 1 illustrates a scanning apparatus employed in carrying out the present invention.

As illustrated in FIG. 1, an exemplary scanning apparatus for use in practice of the present invention comprises a laser 10 which directs an energy beam downwardly through the hollow vertical shaft 12 of a motor 14 to a pair of turning mirrors 16, 18 mounted in a rotating disc 20 fixed to the end of the shaft 12. The laser beam is thus displaced from the rotation axis and projected parallel to the rotation axis in a circular scan pattern 22 (see FIG. 2) which repetitively traverses a part 24 that is carried across the laser scan pattern on a conveyor 26. Light reflected from the surface of object or part 24 is returned along the projection path and reflected back up through the shaft 12 to a beam splitter 30 which turns the received reflected light through 90° for reception by a detector 32. The detector generates an analog signal proportional to intensity of received reflected light.

Forward and rear sweep sensors or reference detectors 34, 36 are mounted 180° apart, adjacent the rotating disc 20, so that each one will intercept the laser beam at a point in its scan pattern. A conveyor encoder 38 provides output pulses representing rotation of the conveyor drive wheels, thus representing longitudinal position of the part in the course of its travel across the laser scan pattern.

Figure 2:
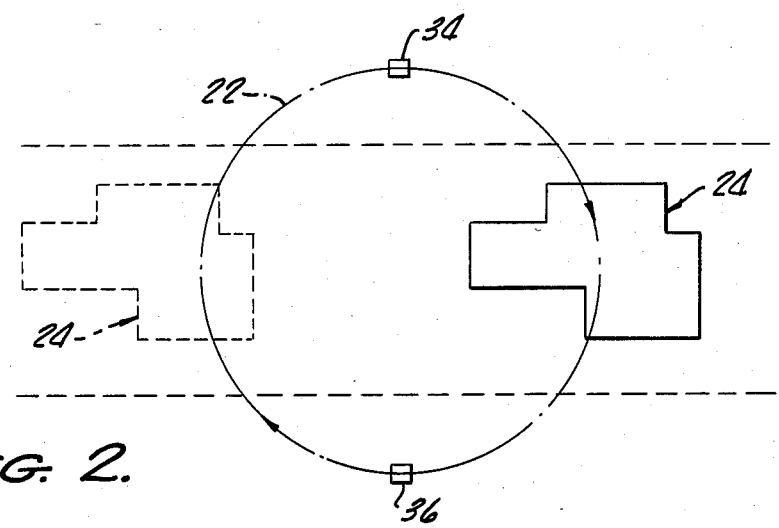
FIG. 2 illustrates the beam scanning pattern of the apparatus of FIG. 1.

As can be seen from the illustration in FIG. 2, the part will cross the scan pattern 22 twice, once at the front of the scan and again at the rear of the scan. The disc rotation is at a considerably higher rate than the rate of motion of the conveyor, so that each part of the scan (the front part and the rear part) will cross the object many times. X, Y coordinates of the laser beam (which are the coordinates of an area or point of the part illuminated by the beam) in the course of its scan, and in a coordinate system fixed to the conveyor and thus fixed to the part, are readily determined from the information provided by the length encoder 38 and the reference or sweep sensors 34, 36, together with the length of the arc along the scan path between the beam position and the reference. Geometry and equations for such calculations are set forth in the above-identified U.S. Pat. No. 4,122,525 and in the above-identified copending application, U.S. Ser. No. 383,950, Filed June 1, 1982, of Homer L. Eaton and John D. Shaylor-Billings.

In accordance with the present invention, the system chooses only that coordinate position information and reflection intensity data that occur at the part edges or other discontinuities. Reflected light energy received by detector 32 is analyzed and, if it exhibits a predetermined parameter, the system signals occurrence of an event. Upon occurrence of such an event, and only upon occurrence of such event, data is collected and processed. In the presently preferred embodiment, the chosen parameter is intensity of reflected light, and the event that triggers data collection is the change of intensity to one or more of a group of preselected intensity levels. Because reflection intensity varies at different points on the part edge, the equivalent of an expanded display of edge detail is obtained by choosing events triggered at a number of preselected levels of intensity of reflected light.

Figure 3:
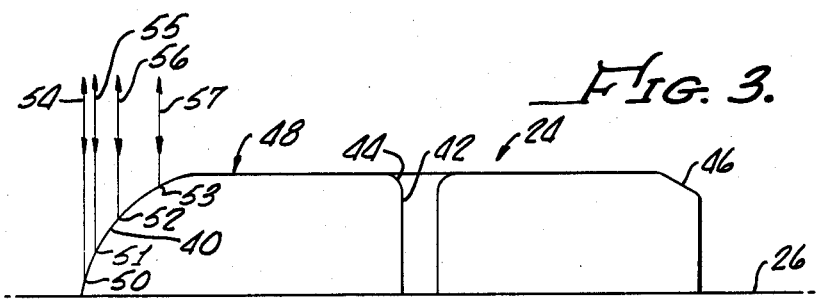
FIG. 3 is an enlarged view of an exemplary part.

Illustrated in FIG. 3 is an enlarged vertical section of a typical part 24 having a number of transitions or discontinuities, such as a curved edge 40, a hole 42 having chamfered edges 44, and a chamfered edge 46. According to the present invention, detailed data concerning the curved part edge 40, the curved edge 44 of hole 42 and the chamfered edge 46 can be obtained with high resolution. This is accomplished without the necessity of handling and processing any data obtained by reflection from the generally flat surface 48 of the part (between edges and discontinuities), and without handling data reflected from the surface of the transporting belt 26.

Consider four points, such as points 50, 51, 52 and 53, on edge 40. In the course of its scan, the laser beam, when at the position indicated at 54 in FIG. 3, will illuminate the point or area 50. At point 50, edge 40 has a relatively steep angle, and thus a relatively small amount of light will be reflected back along the axis of projection of the beam in position 54. During its scan, as the beam moves through positions 55, 56 and 57, respectively, points 51, 52 and 53 on edge 40 are successively illuminated. Each of these points is on an area of the part surface that has a different angle with respect to the beam axis. Thus, these points will reflect increasing amounts of light back along the beam axis as the angle of the edge surface with respect to the vertical increases from point 51 to 52 to 53. In general, the reflection from each of the points on the part edge will have a greater level of intensity that reflection from the substantially nonreflective part background formed by the surface of belt 26. Further, it will have a lower level of intensity than the level of intensity of reflection from the relatively flat high-reflecting surface 48, which, in many cases, is substantially normal to the projected beam and thus provides maximum retroreflection. Similarly, the beam, when impinging upon edges 44 and chamfered edge 46, will also exhibit a varying intensity—above the intensity of reflection from the background and below the maximum of reflected intensity from the part.

A plurality of different levels or thresholds of reflection intensity are preselected and used as thresholds or comparison points for signalling occurrence of an event. The threshold levels are selected at different values, all greater than intensity of reflection from the substantially nonreflective conveyor surface, and all less than the maximum intensity of reflection from the relatively flat, high-reflecting part surface. FIG. 3 illustrates only four such points of different reflection intensity on edge 40. According to a presently preferred form of the invention, sixteen different levels within this range, between the reflection levels of the part upper surface and the belt, are made available. Of course, other numbers of threshold levels, more or less than sixteen, may be employed. When the intensity of the light reflection received by detector 32 is equal to one of the selected threshold levels, an event is signaled. Upon occurrence of such an event, signals defining beam position are collected for coordinate position calculation and transferred for processing together with signals representing the specific threshold level at which the particular event was triggered. Thus, the system provides a window that allows it to see only those points on a transition or discontinuity. The number of points presented for each transition may be readily selected by choice of the number of thresholds and by selective activation of certain ones of the available thresholds.

Figure 4:
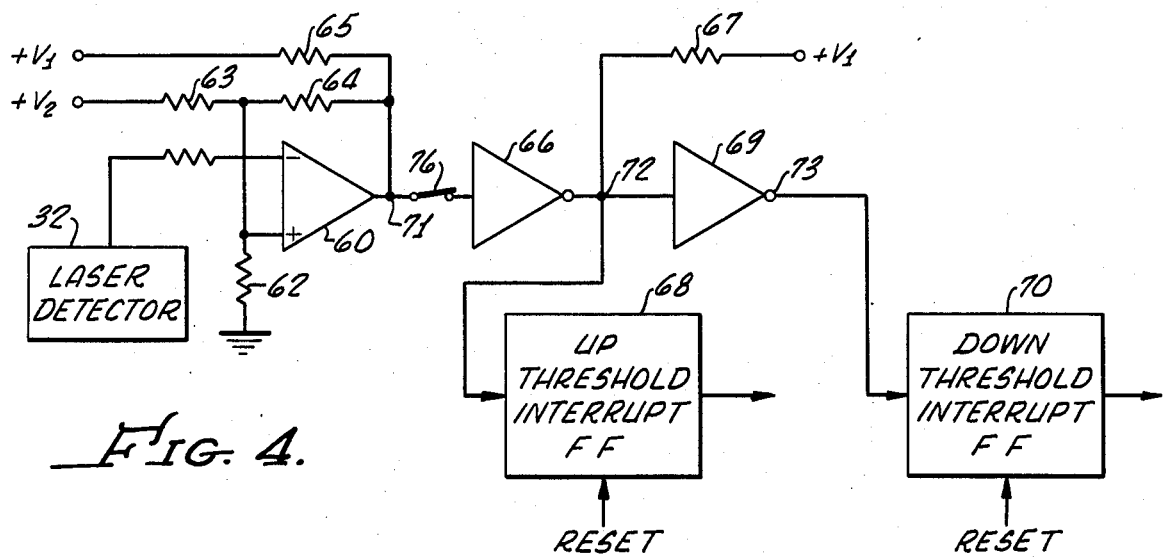
FIG. 4 is a circuit diagram of one of the threshold detector circuits employed for data selection.

A typical threshold detector circuit is illustrated in FIG. 4. The output of the laser detector 32 is fed to the inverting input of a differential or comparator amplifier 60 having its noninverting input connected to ground via a resistor 62 and to a voltage source $+V_2$ via a resistor 63. The amplifier output is connected back to its noninverting input via a resistor 64 and is also connected to a positive potential $+V_1$ via a resistor 65. The voltage sources $V_1$ and $V_2$ and the several resistors are chosen to select a given threshold level (e.g., the voltage at the noninverting input) for the comparator amplifier. The output of the amplifier is fed to an inverting amplifier 66 which has its output connected to the voltage source $V_1$ via a resistor 67, and also connected to trigger an up threshold interrupt flip-flop 68. The output of amplifier 66 is further connected to a second inverting amplifier 69 having its output connected to trigger a down threshold interrupt flip-flop 70. The event trigger signal is the positive going transition from the output of either of inverters 66 and 69.

The output of detector 32 is low when the laser beam impinges upon the nonreflective conveyor and rises as the scanning laser beam begins to traverse the part edge, as previously explained. As the laser detector output goes from a relatively low reflection intensity to a higher reflection intensity, the inverting input of amplifier 60 will rise above the reference level established on its noninverting input. Thus, the amplifier output, at point 71, will drop to produce a positive-going output at point 72, the output of inverter 66. The flip-flops are triggered by positive-going signals, and thus the positive-going transition at point 72 will trigger the up flip-flop 68. As the output of inverter 66 goes positive, the output of inverter 69 goes negative, so that down threshold interrupt flip-flop 70 is not triggered during an up transition.

When the laser detector has a maximum output, as when the beam is reflected from the surface 48 of the object, point 71 is low, point 72 is high, and point 73 (the output of inverter 69) is low. As the beam starts to leave the part and begins to traverse an edge (or when the beam is traversing an edge of a discontinuity that produces a decreasing intensity of reflection), the inverting input of the amplifier 60 will drop below the reference level at its noninverting input and point 71 will go high to produce a negative-going signal at point 72 and a positive-going signal at point 73. Thus, the down threshold interrupt flip-flop is then uniquely triggered by the positive transition at point 73.

Any one or more of the threshold circuits can be deactivated individually by any suitable means. A switch 76 in the output of amplifier 60 is shown to illustrate the function of selective activation of individual ones of the threshold circuits. In a presently preferred embodiment, such selective activation is accomplished by selectively gating the outputs of the several flip-flops 68, 70, as shown in FIG. 6a and described below.

The triggering of either the up or the down flip-flop signals occurrence of an event. The circuit illustrated in FIG. 4 (except for the laser detector 32 and the power supplies) is duplicated for each event level that is chosen. Thus, if, as indicated in FIG. 3, four different threshold levels are to be identified, there will be four such circuits, each identical (except for its reference or threshold level) to the circuit of FIG. 4, including four up and four down flip-flops. If sixteen levels are chosen, there will be sixteen such circuits, each having a different threshold bias established at the noninverting input of its differential comparator amplifier 60.

Figure 5:
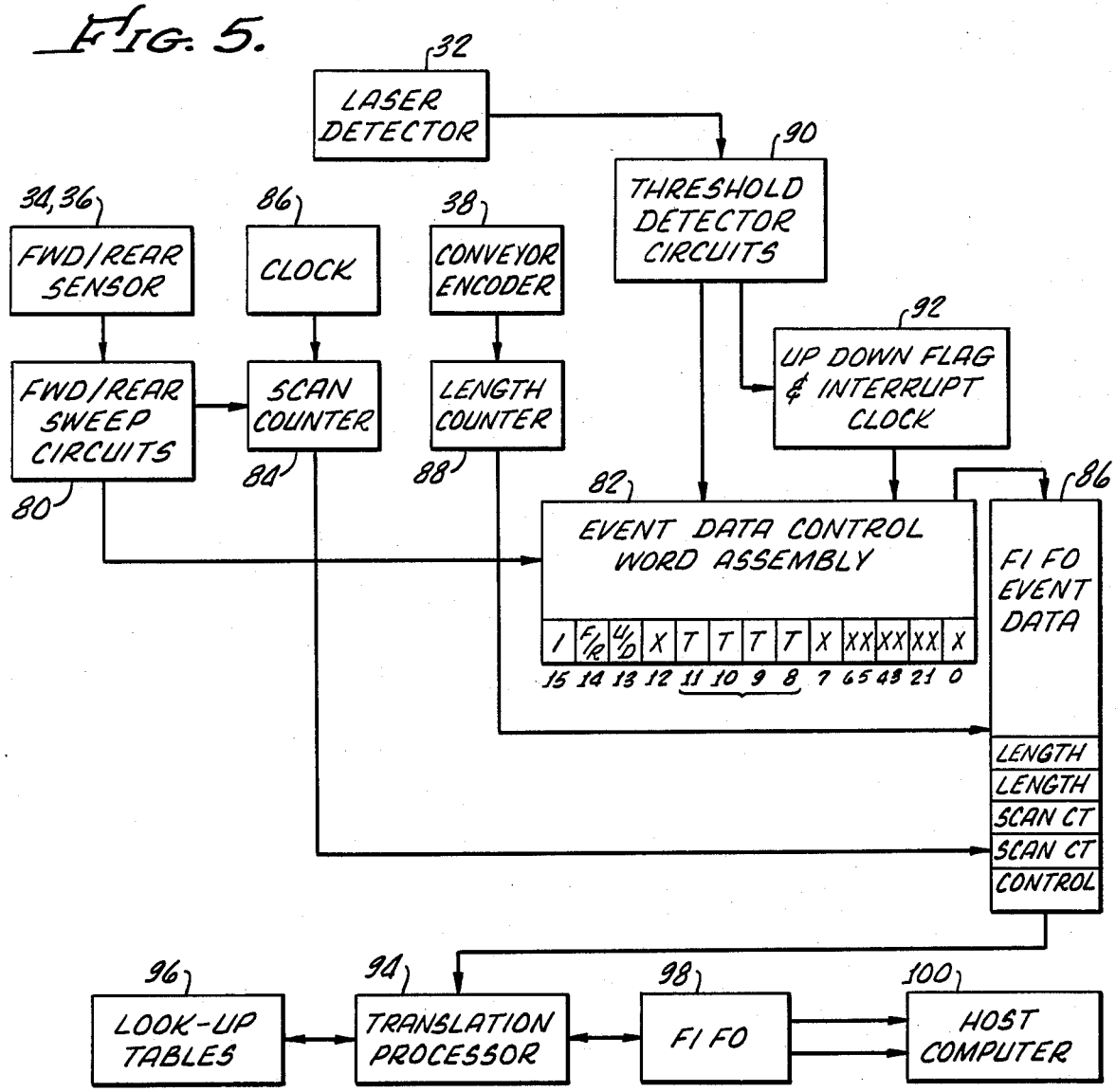
FIG. 5 is a functional block diagram of a system for organizing collected data.

FIG. 5 functionally illustrates the event scan hardware circuits which compose or assemble event data upon occurrence of each event. The composed or assembled event data include three components, namely, length data, scan count data, and an event control word. The length and scan count data collectively comprise the information that defines the X, Y coordinate position of the scan beam at the time of occurrence of the event. As previously mentioned, the length data is derived from the conveyor encoder 38 and represents linear distance traveled by the conveyor and object relative to the laser scan pattern. The scan count comprises the count of a number of pulses of a fixed repetition rate clock during the time that the beam travels from a reference point on the circular scan path 22 (see FIG. 2) to the point at which the event occurs. The event data control word includes an identification of that specific one of the threshold levels at which the particular event occurred, an indication of whether it occurred in a forward or rear portion of the sweep, and an indication of whether it occurred during an up or down transition. An up transition occurs when the beam moves from a point of relatively low reflection intensity to a point of higher reflection intensity, or more specifically from the background of the conveyor to the part. A down transition occurs when the reflection intensity changes from a higher to a lower level, or more specifically when the beam leaves the part to impinge upon the background conveyor.

As shown in FIG. 5, signals from the forward and rear sweep sensors 34, 36 are fed into forward and rear sweep circuits 80 which provide one input to a sixteen bit event data control word assembly latch 82. The latch assembles a sixteen bit control word in which the first eight bits, bits 0-7, are not used. The next four bits, bits 8-11, collectively define one of sixteen selected threshold levels (T). Bit 12 is not used. Bit 13, having a one or a zero, indicates whether the specific event occurred during an up or a down transition (U/D). Bit 14, having a one or a zero, indicates whether the event is occurring in a forward or rear sweep (F/R), and the last bit, bit 15, may contain a one in a particular embodiment to distinguish this control word from some other control word that is not related to the event data.

With its count initiated by a signal from the forward and rear sweep circuits 80, a scan counter 84 counts fixed repetition rate clock pulses from a clock circuit 86 to provide to an event data FIFO (first in, first out) register 86 two eight bit words representing the scan count. A length counter 88, receiving pulse information from the conveyor encoder 38, provides to FIFO 86 two eight bit words representing the length, or, more specifically, the position of the conveyor-fixed X, Y coordinate system along the length of travel of the conveyor belt.

The output of laser detector 32 is fed in parallel to each of sixteen identical threshold detector circuits, collectively designated at 90 in FIG. 5. Each of these parallel circuits, as previously mentioned, is identical to the single circuit illustrated in FIG. 4. At any given event, that is, when the received reflection intensity signal attains the threshold level of any one of the active comparator circuits, a signal is fed to an up/down flag and interrupt clock circuit 92, which sets the up/down bit of the control word of latch 82, and also intiates a cycle that controls the shifting of information into the FIFO register 86. Upon occurrence of the same event, the active threshold comparator circuit also feeds to the event data latch 82 four bits (indicated as "T" in the control word shown in FIG. 5) that collectively define the threshold level of the particular comparator circuit that has produced the positive going transition or event signal to its threshold interrupt flip-flop.

The eight bit event data control word, two eight bit scan count words (one having the eight most significant bits and the other having the eight least significant bits), and the two similarly divided eight bit length count words are stored in adjacent addresses of the FIFO register upon occurrence of an event, and read out to and at a rate controlled by a translation processor 94. The translation processor employs the length and scan count words to enter a set of look up tables 96 in which are stored precalculated X, Y coordinate positions for each combination of length and scan count. Although a real-time computation of coordinates may be used, the look up tables provide information more rapidly. The translation processor transmits the X, Y coordinate data, together with the event data control word, to a FIFO register 98 which feeds the data to a host computer 100, or other data processor, for handling, processing, and display.

In FIFO 98, just as in FIFO 86, the data for each event is handled in five bytes. In FIFO 98, a five byte block of data includes the control word, which had been assembled in latch 82, two bytes identifying the X coordinate position, and two bytes identifying the Y coordinate position. These five bytes of data for each event are transmitted as a data block to the host computer, so that for each event there is presented to the computer the position at which the event occurred, the intensity level at which it occurred, whether it occurred on an up or down transition, and whether it occurred in the course of a forward or rear portion of the laser sweep.

As mentioned above, any number of the sixteen (more or less) threshold detector circuits may be selected and the others deactivated (by means of switch 76, FIG. 4). Only information from the activated threshold detector circuits is processed and transmitted to the host computer. Thus, a plurality of threshold detector circuits are activated according to the amount of detail of the edge configuration (or other transition) that is desired, activating fewer threshold circuits when less detail is required and activating more of the threshold circuits when greater detail is required. Regardless of how many threshold circuits are activated, the data transmitted to the host computer relates only to the event data and, therefore, relates only to a part edge, discontinuity, or similar transition. Other data obtained during the complete scan of the part, but not related to edges, discontinuities, or transitions, is effectively eliminated. Thus, as compared with a system that collects data over the entire scanned area, a great majority of such data is discarded and the retained information concerns solely part edges or other transitions. From one point of view, the system provides an expanded view of only a particularly specified area of interest. In effect, a high resolution expanded view of edges and discontinuities is provided with minimum data handling capacity.

Figure 6B:
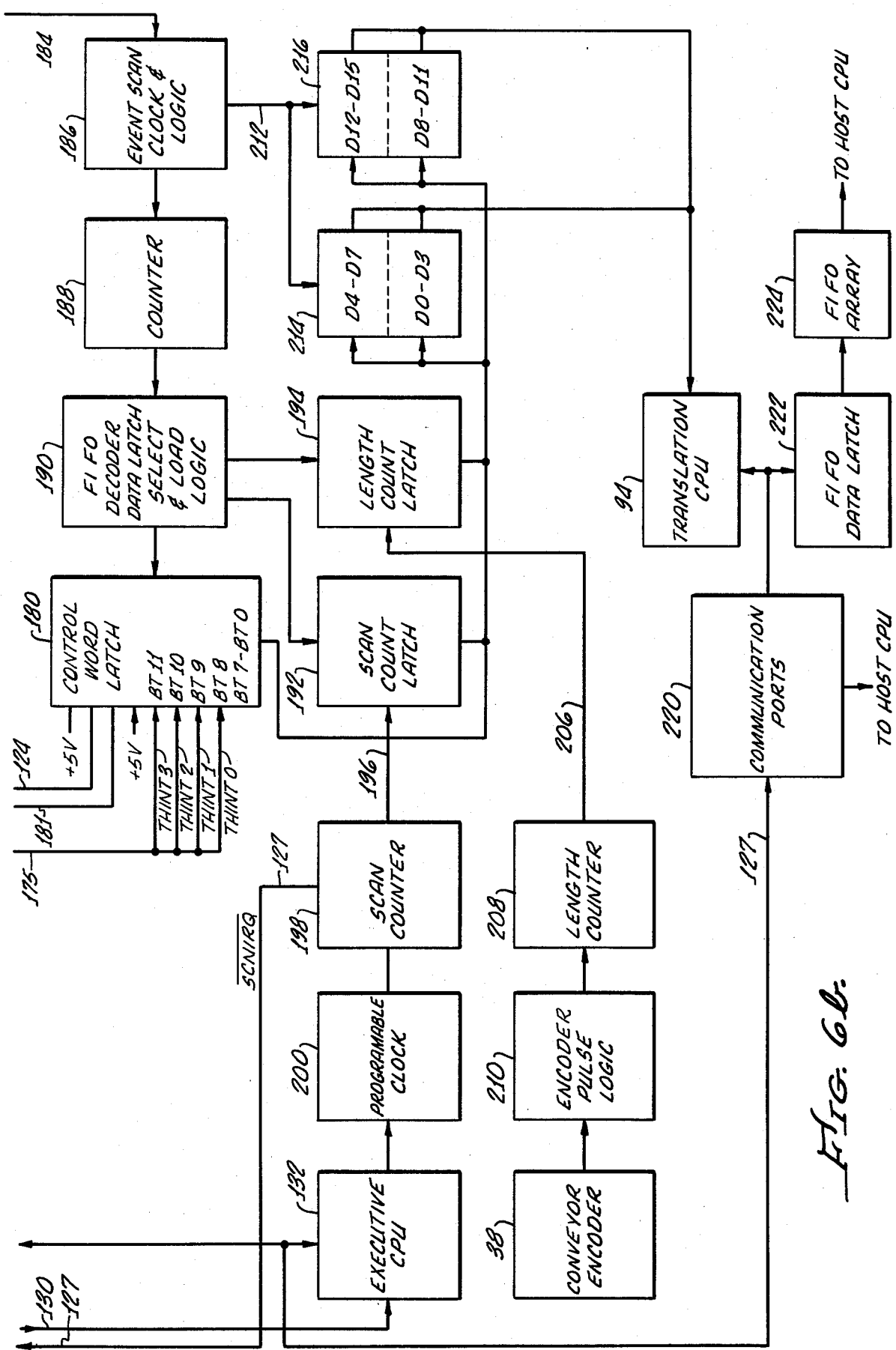

FIGS. 6a and 6b, with FIG. 6b placed below FIG. 6a, form a more detailed diagram of the event scan logic for generating and composing blocks of data upon occurrence of each event. As illustrated in FIG. 6a, signals from laser detector 32, forward sweep detector 34, and rear sweep detector 36 (shown as photosensitive diodes) are fed to amplification and shaping circuits 110, which provide on lines 112 and 114 forward sensor and rear sensor signals that are fed to trigger forward and rear sweep interrupt flip-flops, collectively shown at 116. The flip-flops, when triggered, provide a forward sweep signal on a line 120 that sets a forward/rear sweep flip-flop 122. The latter, when its output is high, provides the forward or rear sweep signal F/R on an output line 124. Flip-flops 116, when triggered by the rear sense signal, provide a rear sweep signal output on a line 126, which is also fed to the forward/rear sweep flip-flop 122 to reset this flip-flop, thus providing a low on its output line 124 indicating the rear sweep. The forward sweep and rear sweep signals on lines 120 and 126 are also fed, together with a third signal $\overline{\text{SCNIRQ}}$ (indicating scan counter over-run), on a line 127, as inputs to a priority interrupt control 128 which encodes its inputs to provide on an output line 130 a four bit command signal $\overline{\text{EXCIRQ}}$ indicating front sweep, rear sweep, or scan counter over-run. This signal triggers an executive CPU 132 (FIG. 6b) to preset and enable the data control circuits on occurrence of each forward and rear sweep. The executive CPU readies the data circuits for assembly of data for each event that occurs (during a half scan) after each forward or rear sweep sense signal but before the following sweep sense signal. It will be understood that the drawings of FIGS. 6a and 6b show plural signal lines between circuits by only a single line in some instances, for purposes of clarity of the drawings.

Threshold detector circuits 90 provide "up" event signals on one or more of sixteen lines 140 to respective ones of sixteen up threshold interrupt flip-flops 142 (which include the up flip-flop 68 shown in FIG. 4) and also provide as many as sixteen down event signals on sixteen lines 144 that are fed to sixteen down threshold interrupt flip-flops 146 (which include the down threshold interrupt flip-flop 70 of FIG. 4). As previously described, only one of these flip-flops is triggered upon occurrence of any one event. When triggered or set, each of the up threshold interrupt flip-flops 142 sends a signal on one of sixteen lines 148 to up interrupt enable logic 150, comprising sixteen coincidence gates. Each of these gates receives a first input from one of the up threshold interrupt flip-flops and a second signal from a sixteen bit event scan up/down interrupt enable latch 152. The bits of latch 152 are set by the executive CPU 132 to thereby activate a selected one or group of threshold detector circuits. Thus, the latch 152 will enable a selected group (any one, two or more) of the coincidence gates of logic 150. When one of the so-enabled gates receives a second input from its corresponding up threshold interrupt flip-flop, an output is provided on one of sixteen lines 154 to an up interrupt priority encoder 156 that has a five line output 158. Four of the lines of output 158 carry binary signals that collectively comprise an up threshold level interrupt signal that identify that one of the sixteen up threshold interrupt flip-flops that has been triggered. Upon occurrence of an up event at any up threshold level, the fifth line provides a high event flag signal that is sent to a set input 160 of an up/down flag flip-flop 162. The four binary signals defining the specific threshold level of the triggered event are fed via four lines 164 to an up/down priority multiplexer 166, which also receives binary signals on four lines 168 that collectively identify a given one of the threshold levels at which a particular down event is triggered. Binary signals on lines 168 are provided from a down interrupt priority encoder 170, which receives sixteen inputs via lines 172 from a down interrupt enable logic circuit 174 composed of sixteen coincidence gates similar to the gates of up interrupt enable logic 150. The gates of down logic 174 are selectively enabled from the event scan up/down interrupt enable latch 152 and triggered by an individual one of the sixteen down threshold interrupt flip-flops 146, when it has been set by a down event. Accordingly, the multiplexer 166 provides on four output leads 175 a four bit threshold interrupt signal identified as THINT 0-3. These are the bits that are to be fed into bit positions 8–11 of the event data control word shown in FIG. 5.

The four bit up and down threshold level interrupt signals from encoders 156 and 170 are also fed to up and down threshold interrupt rest logic 176, 178, each comprising a four to sixteen line decoder. Each of the sixteen outputs from decoders 176, 178 is fed to reset an individual one of the up and down threshold interrupt flip-flops 142, 146, which then are ready for occurrence of the next event.

Threshold interrupt bits 0–3 are fed to bit positions 8–11 of a sixteen bit control word latch 180 (FIG. 6b) of which bits 0–7 and 12 are not used, as previously described. Bit 13 receives the U/D signal on a line 181 from the up/down flag flip-flop 162. Bit 14 receives the F/R̄ forward or rear sweep identifying bit from line 124 of forward/rear sweep flip-flop 122. Bit 15 is always high to identify this control word as an event scan control word. (A complete system may also provide a second control word for lower resolution, full surface area scan data, entirely independent of event scan data.)

Like the up interrupt priority encoder 156, the down interrupt priority encoder 170 provides a fifth or flag output denoting occurrence of the down event, which is sent via a line 174 to clear the up/down flag flip-flop 162. Signals on both of the set and reset lines of the flip-flop 162 are also fed to trigger an up/down interrupt clock flip-flop 182 which provides the output U/DICL (up/down interrupt clock) on a line 184. This clock, in effect, is the event signal that denotes occurrence of an event and is fed to initiate operation of an event scan clock and shift in logic circuit 186 (FIG. 6b). The up/down interrupt clock initiates a higher frequency internal clock of logic circuit 186, which is counted by a four bit counter 188 of which the output is fed to a FIFO decoder data latch select and load logic 190. The latter controls the setting of data into each of the control word latch 180, a scan count latch 192, and a length count latch 194. As previously mentioned, the data fed into control word latch 180 comprises the four lines from the multiplexer which collectively indicate the threshold level, the up/down flag from flip-flop 162, and the forward/rear sweep signal from the flip-flop 122.

Data to scan count latch 192 is derived via sixteen lines 196 from a scan counter 198 that counts pulses from a programmable clock 200 of which the clock rate is set by the executive CPU 132. The latter, under control of the signal EXCIRQ from priority interrupt control 128, initiates operation of the clock upon occurrence of a forward or rear sweep signal. The output of the scan counter is a continually changing (at each clock 200) sixteen bit word fed on sixteen lines to the scan count latch 192. The scan counter also provides the output SCNIRQ on line 127, which is fed to the priority interrupt control 128 to indicate that the counter has overflowed, which is an unacceptable condition that requires the resetting or restarting of a measurement.

The length count latch 194 receives its sixteen bit input on sixteen lines 206 from the output of a length counter 208 which counts pulses from encoder pulse logic 210 receiving inputs from the conveyor encoder 38.

Thus, the event scan clock and logic 186 controls sequential latching of information into the three data latches 180, 192 and 194 and, in addition, provides an output on a line 212 to a FIFO array 214, 216 to control shifting of data from the three latches 180, 192 and 194 into the FIFO 214, 216. The FIFO, in a presently preferred embodiment, comprises an array having storage of sixtyfour sixteen bit words. Alternatively, the FIFO may have as many as 256 eight bit words with the sixteen bit length and scan words each stored in adjacent eight bit sections.

Data is read out of the FIFO 214, 216 at a rate slower than the read in rate, under control of the translation CPU 94 and transmitted through communication ports 220 to look up tables in the host computer. Data from the look up tables (X, Y coordinates), and the event data control word from FIFO 214, 216, is fed, still under control of the translation CPU, into a second FIFO data latch 222, and then set to an output FIFO 224 which feeds the coordinate position data, threshold level data, and related data for each event to the host computer. The data in FIFO 224 comprises data blocks each having a sixteen bit X coordinate, a sixteen bit Y coordinate, a four bit event threshold level, and bits denoting up/down and forward/rear, as previously described. Thus, although the laser scans the entire field including all of the part surface, the data collected relates only to the preselected events (selected by choice of threshold detector activation), and all other data received in the course of the scan is ignored.

There have been described methods and apparatus for scanning a part so as to provide expanded detail of data related to discontinuities while minimizing the amount of acquired data that must be handled.

The foregoing detailed description is to be clearly understood as given by way of illustration and example only, the spirit and scope of this invention being limited solely by the appended claims.

What is claimed is:

1. The method of scanning surface characteristics of an object to selectively obtain data representing only portions of the surface having selected characteristics comprising moving a scanning energy beam in a scan pattern across the object so that beam energy reflected from discrete positions on the object is detectable, relatively moving the object and scan pattern to cause the beam to illuminate areas on the surface of the object in scan paths that repetitively cross the object, generating position signals representing the position of the beam in said scan paths, in reference to discrete positions on the object, detecting energy of said beam reflected from said object at such discrete positions, employing the magnitude of detected energy to select certain of the position signals, each corresponding to a selected discrete position, based upon the occurrence of a detected energy magnitude at one of a plurality of different magnitudes of detected energy, and employing the selected position signals and the magnitude associated with each such selected position signal to define details of the surface characteristics of only those portions of the object having the selected characteristics of the object.

2. The method of claim 1 including the step of establishing said predetermined magnitudes at a value between the magnitudes of energy reflected from said object and from the background of the object.

3. The method of scanning surface characteristics of an object to obtain detailed data representing points within a discontinuity of the object along a line transverse to the discontinuity comprising moving a scanning energy beam in a scan pattern across the object so that beam energy reflected from discrete positions within a discontinuity of the object along a line transverse to the discontinuity is detectable, relatively moving the object and scan pattern to cause the beam to illuminate areas on the surface of the object in scan paths that repetitively cross the object, generating position signals representing the position of the beam in said scan paths in reference to discrete positions including a plurality of portions within a discontinuity along a line transverse to the discontinuity on the object, detecting energy of said beam reflected from said object at such discrete positions, employing the magnitude of detected energy to select certain of the position signals each corresponding to a selected discrete position within a discontinuity, based upon the occurrence of a detected energy magnitude at one of a plurality of different magnitudes of detected energy, said step of selecting position signals comprising generating an event signal when detected beam energy reflected from the object attains any one of a number of mutually different predetermined magnitudes, and selecting only those position signals that represent position of the beam when an event signal occurs.

4. The method of scanning a part for surface discontinuities comprising the steps of moving an energy beam over an object in a scan path so as to cause energy to be reflected from the object and its background, receiving energy of the beam reflected from the object and its background, comparing the level of a parameter of received reflected beam energy with each one of a group of reference levels of such parameter, signaling occurrence of an event when the compared level of the parameter of the received reflected energy has a predetermined relation to at least one of said reference levels, and indicating the position of the beam upon occurrence of said signaled event.

5. The method of claim 4 wherein said parameter is intensity of reflected energy, wherein said event is signaled whenever the level of received reflected energy is the same as one of said reference levels of reflected energy intensity, and including the step of indicating that one of the reference levels at which the event is signaled, in conjunction with the indicating of position of the beam upon occurrence of said signaled event, to thereby indicate the beam position and reflection intensity level at which each event occurs.

6. The method of claim 5 including the step of indicating the sense of variation of received reflected energy at each signaled event, to thereby indicate sense of a transition.

7. The method of determining configuration of a part comprising scanning an energy beam across said part in a fixed direction, receiving energy reflected from the part and its background in a direction opposite the fixed direction whereby the received energy at different times in the scan has been reflected from respective different areas of the part, and the intensity of the reflected energy varies according to, at least, the contour of the part in relation to the fixed direction as the beam traverses the part, selecting a plurality of levels of intensity of reflected beam energy intermediate of the maximum level of energy reflected from the part and the level of energy reflecte from its background, and indicating positions of the beam only at the times that the reflected energy has a predetermined relation to one of the selected levels.

8. The method of claim 7 including receiving said reflected energy in a direction parallel to the fixed direction of the scanning beam, and wherein said beam position is indicated in two dimensions with respect to said part, said part having a portion with points thereof at different angles relative to said direction parallel to the fixed direction, whereby intensity of received reflected energy varies with the angle of the point within the portion at which energy is reflected, and whereby indicated positions of the beam occur for all points within the portion having one of a plurality of different angles.

9. The method of claim 7 wherein said step of indicating positions comprises indicating positions of the beam when the level of reflected energy equals a selected level.

10. The method of claim 3 wherein said step of indicating positions comprises generating position signals representing the positions of the beam throughout at least a portion of its scan that traverses the part, generating an event signal when the level of reflected energy received from the part is equal to any one of a group of said intermediate levels of reflected energy, selecting only those position signals that occur together with said event signals, and indicating with the selected position signals the level of intensity of reflected beam energy upon occurrence of each said event signal.

11. Scanning apparatus for providing data representing details of a surface discontinuity comprising carrier means for supporting an object to be scanned, said object having surface discontinuities which reflect energy with different intensities at different points within the discontinuity along a scan that traverses the discontinuity, a scanning device comprising means for generating an energy beam in a fixed direction moving in a scan pattern across an object supported by the carrier means, means for effecting relative motion of said carrier means and said scanning device to thereby move said scan pattern over said object in a plurality of paths that repetitively traverse the object, its surface discontinuities, and said carrier means, means for receiving energy of said beam reflected from said object and carrier means in a direction opposite the fixed direction, the magnitude of said reflected energy varying between a first value when reflected from the carrier means and a second value when reflected from parts of the object generally perpendicular to the fixed direction, as the beam moves across the object, and varying between said values when reflected from different points within the discontinuity along a line transverse to the discontinuity, event means responsive to said reflected energy receiving means for detecting occurrence of a predetermined relation of the magnitude of said reflected energy to any one of a plurality of preselected discrete magnitudes between said first and second values, and means responsive to said event means for indicating position of said beam in a coordinate system fixed to said part upon detection of said predetermined relation, thereby to indicate positions of a plurality of different points within the discontinuity along a scan that traverses a discontinuity, which points reflect with different intensities.

12. The apparatus of claim 11 wherein said event means comprises means for detecting a change of magnitude of reflected energy to said preselected magnitude.

13. The apparatus of claim 11 wherein said event means comprises an electrical comparator, means for establishing a reference level in said comparator, and means responsive to said receiving means for transmitting to said comparator an electrical signal having a magnitude indicative of the magnitude of energy received by the receiver.

14. The apparatus of claim 11 wherein said event means comprises a plurality of electrical comparator means responsive to said energy receiving means for producing an event signal when received reflected energy attains the respective comparator reference level, means for establishing a different reference level for each said comparator, and means for transmitting to said comparators an electrical signal representing received reflected energy, said means for indicating position comprising means for generating beam position signals indicating postiion of said beam upon occurrence of each said event signal.

15. The apparatus of claim 14 including means for indicating the individual reference level for each indicated beam position signal at which the corresponding event signal occurred.

16. The apparatus of claim 14 including means for generating threshold level signals each paired with a respective one of said beam position signals, said threshold level signals each indicating a reference level of one of said comparators.

17. The apparatus of claim 11 including means for indicating the sense of the variation of the magnitude of said reflected energy.

18. The apparatus of claim 11 wherein said event means comprises a plurality of threshold detector circuits, each having a different preselected reference level, means responsive to the energy receiving means for transmitting to each said threshold detector circuit a signal representing magnitude of reflected energy, each said threshold detector circuit including means for generating an up event signal when said reflection intensity signal from the energy receiving means rises to the reference level of the individual comparator, and including means for generating a down event signal when said reflection intensity signal falls to the reference level of the individual comparator, said means responsive to said event means for indicating position including means for indicating beam position upon occurrence of an output from one of said comparators, and indicating, together with such indication of beam position, an identification of the individual comparator providing such output and whether such output is an up or down event signal.

19. The apparatus of claim 18 wherein each threshold detector circuit comprises a differential amplifier having a reference level established at a first input thereof and having a second input thereof connected to receive a reflection intensity signal from said reflected energy receiving means, a first inverter having an input connected to the output of said amplifier and having an output, an up threshold interrupt flip-flop connected to be triggered from the output of said first inverter, a second inverter having an input connected to the output of said first inverter and having an output, and a down threshold interrupt flip-flop connected to be triggered from the output of said second inverter.

20. The apparatus of claim 19 wherein said means for indicating position comprises scan counter means for generating scan count signals representative of position of the beam in the course of its scan, length counter means for generating length count signals representative of position of the carrier means relative to said scanning device, event data control word assembly means for generating threshold interrupt signals representing the reference level at which each event signal occurs, and storage means for said threshold interrupt signals together with the length and scan count signals corresponding to an individual event.

21. Scanning apparatus comprising
a carrier for supporting an object to be scanned,
a scanning laser projecting a light beam in a fixed direction and in a scan pattern across the object and carrier,
means for moving the carrier relative to the scan pattern to cause said scan pattern to repetitively cross the surface of said object,
a detector receiving light of said beam reflected from points of the object surface crossed by said scan pattern and having an output representating intensity of reflected light in a direction opposite the fixed direction,
a plurality of comparators responsive to said detector output, said comparators each having a different reference level and each having an output representing coincidence of said detector output and a respective one of said reference levels, and
means for indicating the respective position of said light beam upon occurrence of any one of said comparator outputs.

22. The scanning apparatus of claim 21 wherein at least one of said comparators comprises first direction sensitive means for generating said output when said detector output rises to said reference level and second direction sensitive means for generating a second comparator output when said detector output falls to said reference level, and means responsive to said direction sensitive means for identifying said comparator outputs.

23. Scanning apparatus comprising
a carrier for supporting an object to be scanned,
a scanning laser projecting a relatively small area light beam, having an axis of columnation, in a fixed direction and in a scan pattern across the object and carrier,
means for moving the carrier relative to the scan pattern to cause said scan pattern to repetitively cross the surface of said object,
a detector receiving light of said beam reflected in a direction opposite the fixed direction from points of the object surface crossed by said scan pattern and having an output representing intensity of reflected light,
a comparator responsive to said detector output, said comparator having a reference level and having an output representing coincidence of said detector output and said reference level, means for indicating position of said axis of columnation of said light beam upon occurrence of said comparator output, and a plurality of additional comparators responsive to said detector output, each having an unique reference level and having an output representing coincidence of said detector output and the reference level of the respective comparator, said means for indicating position including means for indicating position of said axis of columnation of said light beam upon occurrence of the output of each of said comparators and indicating the individual comparator producing such output together with the position indication to thereby indicate beam position relative to the object when reflected light has each one of a number of different intensities.

24. The apparatus of claim 23 wherein each said comparator includes direction sensitive means for generating a first comparator output when the detector output increases to a value above the comparator reference level and for producing a second comparator output when the detector output decreases below the comparator reference level, said first and second outputs respectively indicating transition of the scanning light beam from areas of lower to areas of higher reflection intensity and from areas of higher to areas of lower reflection intensity to thereby denote arrival of the scanning beam at the object to be scanned and departure of the beam from the object.

25. The method of scanning an object to provide enhanced resolution contour data for regions of the object having contours, said method comprising sweeping a relatively small area energy beam in a fixed direction across the object in a plurality of scan paths to illuminate points of the object lying in said paths and to cause beam energy to be reflected from the object with intensity that varies along said paths, said object having at least a portion with different points within said portion extending at different angles with respect to a plane perpendicular to said fixed direction, said different angles causing the beam energy to be reflected with intensity that varies from point to point within said portion, selecting a number of different reference levels of reflection intensity, comparing intensities of reflected beam energy with said reference levels to detect the occurrence of a reflected beam energy having a predetermined relation to a respective one of said reference levels, and indicating location of the point at which reflected beam energy has such predetermined relation, to thereby provide data indicating the locations of points of said portion that reflect beam energy at said predetermined relation to any of the respective reference levels.

26. For use with a scanning apparatus in which a relatively small area columnated laser beam, having an axis of columnation, and emanating in a fixed direction is moved in a scan pattern across an object transported past the scan pattern by a carrier so that light of the scanning beam is reflected from the object and the carrier along a line opposite from the fixed direction, event data means comprising detector means responsive to reflected light energy for generating a signal representing the intensity of the reflected light energy, means for generating a length signal representing position of the carrier and object transported thereby relative to the laser scan pattern, scan counter means for generating a scan position signal representing position of the scanning beam in its scan pattern, a plurality of threshold detector circuits having mutually different reference levels, each circuit receiving said reflected light energy intensity signal from said detector means, and each including means for generating an event output signal when the reflected light energy intensity signal attains the reference level of the individual detector circuit, intensity identification means responsive to said threshold detector circuits for producing an event data signal identifying which of the threshold detector circuits produces an event output signal, and storage means, operable upon occurrence of an event output signal, for storing each event data signal together with the length signal and scan position signal occurring together with said event output signal.

27. The apparatus of claim 26 wherein each said threshold detector circuit includes means for generating an up/down signal representing either rise or fall of the reflection intensity signal, and wherein said event data signals include said up/down signal.

28. The method of scanning an object to detect selected surface characteristics and to provide high resolution data regarding detected surface characteristics without providing high resolution data over the entire scan, said method comprising the steps of moving a small area scanning energy beam across the object so that beam energy is reflected from the object at successive points on a scan across a selected surface characteristic, said selected surface characteristic reflecting said scanning energy beam with intensity that varies from one point to another on said scan across said selected surface characteristic, whereby variation of intensity of energy reflected from successive points represents variation of said selected characteristic, detecting energy of said scanning energy beam reflected from said object, preselecting a plurality of reference magnitudes respectively corresponding to magnitudes of energy reflected at different selected magnitudes from within all of the possible different magnitudes of energy reflected from each of the possible points on a scan across a selected surface characteristic, and selecting only those positions of said scanning energy beam at which occur reflected energy having any one of said reference magnitudes, thereby to enable high resolution display of detail of a selected surface characteristic.

29. The method of claim 28 wherein said surface characteristic is a surface discontinuity, wherein said scanning energy beam is projected in paths parallel to itself and substantially perpendicular to at least some portions of said object in a scan pattern that crosses the object, said surface discontinuity having contoured portions thereon having contours which are not substantially perpendicular with respect to scanning energy beam, whereby said selecting of positions provides data representing position of said beam only at points of said contoured portions of said surface having discretely different contour properties to thereby provide data representing a plurality of points on a scan across said surface discontinuity and the variance of the contour property at each such point from the portions of the object substantially perpendicular to the energy beam direction.

30. A method of determining the configuration of a part moving relative to a scanning station containing a source of columnated light, having an axis of columnation and emanating in a first direction and wherein the part has portions which are generally flat and generally perpendicular to the first direction and is positioned on a background which is substantially less reflective than the part, and positioned in an XY coordinate system in a plane generally perpendicular to the first direction, comprising the steps of moving the light source relative to the part to scan the part in a manner to impinge the column of light upon substantially all of the part during the scanning process, due to the relative movement of the columnated light and the part, detecting the magnitude of the light energy reflected from the part and the background along a path generally aligned with the axis of columnation of the beam and detecting the position of the axis of columnation within the X-Y coordinate system, employing the magnitude of the detected reflected light energy to select certain positions of the axis of columnation within the X-Y coordinate system based upon the occurrence of the reflected light at such selected position equaling one of a plurality of selected magnitudes, storing the position in the X-Y coordinate system of the axis of columnation along with the magnitude of the reflected light energy at such position, and generating a map of the part contours based upon the stored values for the X-Y coordinate system beam positions and the associated reflected energy magnitude for such positions.

31. The method of claim 30 wherein the plurality of selected reflected energy magnitudes are selected to be intermediate the reflected energy from the background and the reflected energy from the generally flat portions of the part which are generally perpendicular to the first direction.

32. An apparatus for determining the configuration of a part moving relative to a scanning station, containing a source of columnated light, having an axis of columnation and emanating in a first direction wherein the part is positioned on a background substantially less reflective than the part and positioned in an X-Y coordinate system in a plane generally perpendicular to the first direction, and the part has portions of the part which are generally flat and generally perpendicular to the first direction, comprising transport means for moving the part and the source of columnated light relative to each other such that after completion of the relative movement the columnated light has impinged upon substantially all of the part due to the relative movement of the part and the source of columnated light, reflection detection means for detecting the magnitude of the light energy reflected from the part or its background along an axis generally aligned with the axis of columnation, position detection means for detecting the position of the axis of columnation in the X-Y coordinate system, selection means for selecting certain positions of the axis of columnation within the X-Y plane upon the occurrence of the magnitude of the reflected energy equalling one of a plurality of selected magnitudes, and storage means for storing data representative of the selected position of the axis of columnation and the magnitude of the reflected energy at such selected positions for each such selected position at which one of the selected magnitude occurs.

33. The apparatus of claim 32 wherein the plurality of selected reflected energy magnitudes utilized by the selection means are magnitudes intermediate the magnitude of the energy reflected by the background and the magnitude of the energy reflected by the portions of the part which are generally flat and generally perpendicular to the first direction.

34. A method of scanning a part to obtain data defining surface characteristics of a discontinuity on a portion of the surface of the part, said data including a plurality of data points dispersed within the portion of the surface containing the discontinuity and along a line that crosses the discontinuity, to thereby provide an output representative of details of the position of the portion of the part containing the discontinuity in relation to the entire part and variations of the discontinuity within the portion containing the discontinuity and along a line that crosses the discontinuity, comprising the steps of causing an energy beam to successively impinge upon a plurality of small adjacent areas of the part positioned along a line that crosses the discontinuity in an X-Y coordinate system within which the part is referenced, receiving reflected energy from the part, selecting some but not all of the small adjacent area locations within the X-Y coordinate system, based upon the occurrence of the reflected energy attaining one of a plurality of different selected threshold levels, and storing the respective locations within the X-Y coordinate system at which there occurs the reflected energy attaining one of the plurality of selected threshold levels and the particular threshold level occurring at each such location, whereby there are stored data points for a plurality of locations on the discontinuity along a line that crosses the dicontinuity.

35. The mthod of claim 34 wherein the part is positioned on a background which is less reflective than any portion of the part, and has portions which are generally free of any discontinuity and thereby reflect the energy beam from such portions at a maximum level, and the plurality of different selected threshold levels are selected to be between the maximum level reflected from the part and the level reflected from the background.

36. An apparatus for scanning a part to obtain data defining surface characteristics of a discontinuity on a portion of the surface of the part, said data including a plurality of data points dispersed within the portion of the surface containing the discontinuity, to thereby provide an output representative of details of the position of the portion of the surface having the discontinuity in relation to the entier part and variations within the portion containing the discontinuity, comprising scanning means for scanning an energy beam to cause the beam to impinge upon a plurality of small adjacent areas of the part positioned in an X-Y coordinate system in which the part is referenced, receiving means for receiving energy reflected from the part, selection means for selecting some but not all of the small adjacent area locations within the X-Y coordinate system, based upon the occurrence of the reflected energy attaining one of a plurality of different selected threshold levels, and storage means for storing the respective locations within the X-Y coordinate system at which there occurs the reflected energy attaining one of the plurality of selected threshold levels and the particular threshold level occurring at each such location.

37. The apparatus of claim 36 wherein the part is positioned on a background which is less reflective than any portion of the part, and has portions which are generally free of any discontinuity and thereby reflect the energy beam from such portions at a maximum level, and the plurality of different selected threshold levels are selected to be between the maximum level reflected from the part and the level reflected from the background.

38. The method of determining configuration of a part comprising scanning an energy beam across the surface of said part, receiving energy reflected from the part and its background in receiving directions parallel to a fixed direction, whereby the received energy at different times in the scan is reflected from respective different areas of the surface of the part, and the intensity of the received energy, reflected in said receiving directions, varies according to the inclination of the surface of the part at respective ones of said areas relative to the fixed direction as the beam traverses the part, selecting a plurality of levels of intensity of reflected beam energy intermediate the maximum level of energy reflected from the part and the level of energy reflected from its background, and indicating positions of the beam only at the times that the reflected energy received in a receiving direction has a predetermined relation to one of the selected levels, whereby data is selected to denote relative inclinations of different areas of the surface of said part to thereby provide an indication of profile of a portion of said part in a plane parallel to said fixed direction.

39. The method of claim 38 including the step of directing the scanning beam toward the object in a projection direction perpendicular to the object and receiving said reflected energy in directions parallel to the projection direction of the scanning beam, said projection direction being parallel to said fixed direction, and wherein said beam position is indicated in two dimensions with respect to said part, said part having a surface portion with points thereof at different inclinations relative to said fixed direction, whereby intensity of received reflected energy varies with the inclination of the area on the surface portion at which energy is reflected.

* * * * *

UNITED STATES PATENT AND TRADEMARK OFFICE
CERTIFICATE OF CORRECTION

PATENT NO. : 4,623,797

DATED : November 18, 1986

INVENTOR(S) : HOMER L. EATON and JOE SCHMIDT

It is certified that error appears in the above-identified patent and that said Letters Patent is hereby corrected as shown below:

Claim 7 (column 12, line 4), delete "reflecte" and substitute therefor —reflected—.

Claim 14 (column 13, line 29) delete "postiion" and substitute therefor —position—.

Signed and Sealed this

Seventeenth Day of March, 1987

Attest:

DONALD J. QUIGG

*Attesting Officer*   *Commissioner of Patents and Trademarks*